United States Patent
Willinger et al.

(10) Patent No.: US 7,555,996 B2
(45) Date of Patent: Jul. 7, 2009

(54) BIRDCAGE FEEDER

(75) Inventors: Jonathan Willinger, Tenafly, NJ (US); Klaus Woltmann, Demarest, NJ (US)

(73) Assignee: J.W. Pet Compnay, Inc., Teterboro, NJ (US)

( * ) Notice: Subject to any disclaimer, the term of this patent is extended or adjusted under 35 U.S.C. 154(b) by 421 days.

(21) Appl. No.: 11/087,728

(22) Filed: Mar. 23, 2005

(65) Prior Publication Data

US 2006/0213450 A1    Sep. 28, 2006

(51) Int. Cl.
*A01K 39/00*    (2006.01)
(52) U.S. Cl. ............ 119/464; 119/477; 119/429; 119/72; 119/57.8; 119/51.01
(58) Field of Classification Search ........ D30/121, D30/124–129, 132, 133; 119/464, 465, 466, 119/459, 467, 469, 475, 477, 429, 454, 52.1, 119/72, 246, 52.2, 51.01, 70, 74, 57.8, 61.3, 119/61.1, 61.5; 248/225.11, 225.21, 315, 248/222.13, 222.14, 223.41, 311.2
See application file for complete search history.

(56) References Cited

U.S. PATENT DOCUMENTS

| | | | | |
|---|---|---|---|---|
| 133,372 A * | 11/1872 | Jewett | .................. | 119/464 |
| 280,532 A * | 7/1883 | Thomas | .................. | 119/464 |
| 1,446,740 A | 2/1923 | Eummelen | | |
| 1,450,494 A | 4/1923 | Eummelen | | |
| 1,530,657 A | 3/1925 | Eummelen | | |
| 1,718,432 A * | 6/1929 | Qualmann | .................. | 119/464 |
| 1,719,769 A | 7/1929 | Kaufman | | |
| 1,755,706 A | 4/1930 | St George | | |
| 1,879,332 A | 9/1932 | Kulp | | |
| 2,334,590 A * | 11/1943 | Spiro, Jr. et al. | ............ | 119/464 |
| 2,936,734 A * | 5/1960 | Chestnut, Jr. et al. | ...... | 119/52.1 |
| 3,049,093 A | 8/1962 | Oliver | | |
| 3,244,150 A * | 4/1966 | Blair | .................. | 119/52.3 |
| D205,772 S * | 9/1966 | Blair | .................. | D30/128 |
| D208,410 S * | 8/1967 | Jacobsen | .................. | D30/124 |
| 3,707,949 A | 1/1973 | Lippi | | |
| 3,866,576 A * | 2/1975 | Downing | .................. | 119/477 |
| 4,450,789 A | 5/1984 | Nilsen et al. | | |
| 4,570,574 A | 2/1986 | Burkholder | | |
| 4,574,738 A * | 3/1986 | Tominaga | .................. | 119/464 |
| 4,696,474 A | 9/1987 | Tegart | | |
| 4,762,086 A | 8/1988 | Atchley | | |
| D300,276 S * | 3/1989 | Bore | .................. | D30/121 |
| 4,995,342 A | 2/1991 | Hinrichs et al. | | |
| 5,086,730 A * | 2/1992 | Figley | .................. | 119/52.3 |
| 5,351,645 A | 10/1994 | Brennon | | |
| 5,467,733 A * | 11/1995 | Messina | .................. | 119/464 |
| 5,549,074 A | 8/1996 | Hui | | |
| 5,669,329 A * | 9/1997 | Krause | .................. | 119/72.5 |
| D393,108 S * | 3/1998 | Atchley | .................. | D30/121 |
| 5,738,042 A * | 4/1998 | King | .................. | 119/464 |

(Continued)

FOREIGN PATENT DOCUMENTS

CH    659570 A5 * 11/1986

*Primary Examiner*—Andrea M Valenti
(74) *Attorney, Agent, or Firm*—Katten Muchin Rosenman LLP

(57) ABSTRACT

A birdcage feeder assembly is configured with a feeding unit, which includes a cup and a transparent shield shaped and dimensioned to minimize the distribution of food debris from the cup, and a holder operative to removably couple the feeding unit to the birdcage.

10 Claims, 8 Drawing Sheets

U.S. PATENT DOCUMENTS

| | | | |
|---|---|---|---|
| 5,771,838 A * | 6/1998 | Bloom et al. | 119/52.2 |
| 5,949,456 A | 9/1999 | Matsumoto et al. | |
| 6,189,489 B1 | 2/2001 | Pearce | |
| 6,230,655 B1 | 5/2001 | Cohen et al. | |
| 6,308,657 B1 | 10/2001 | Schumacher et al. | |
| 6,374,772 B1 * | 4/2002 | Brandt | 119/57.8 |
| 6,390,022 B1 * | 5/2002 | Eichler et al. | 119/72 |
| 6,427,958 B1 * | 8/2002 | Looney | 248/220.21 |
| 6,435,134 B1 * | 8/2002 | Ho | 119/72 |
| 6,561,129 B1 | 5/2003 | Cheng | |
| 6,715,445 B2 | 4/2004 | Plante et al. | |
| 6,971,332 B2 * | 12/2005 | Woltmann et al. | 119/467 |
| 7,146,932 B2 * | 12/2006 | Willinger et al. | 119/461 |
| 2005/0034678 A1 * | 2/2005 | Willinger et al. | 119/467 |
| 2005/0284400 A1 * | 12/2005 | Woltmann et al. | 119/467 |
| 2006/0065199 A1 * | 3/2006 | Davis | 119/51.01 |

* cited by examiner

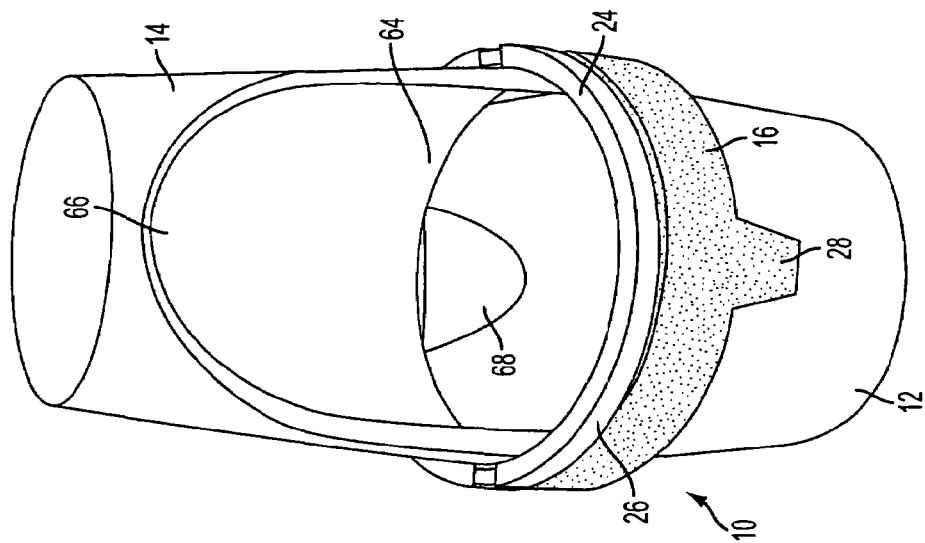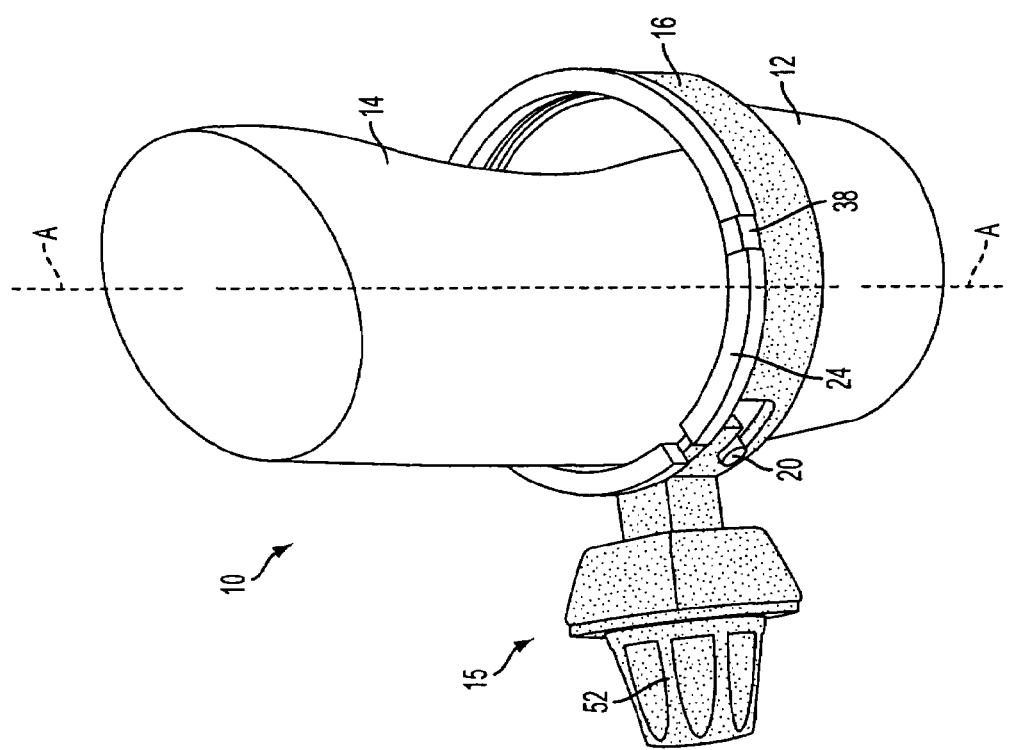

BIRDCAGE FEEDER

BACKGROUND OF THE INVENTION

1. Field of the Invention

The present invention relates to birdcage feeders, of the type known as cup feeders, for use in connection with the task of feeding birds for personal breeders and owners.

2. Description of the Prior Art

In a hurried modern world, pets bring relief and joy to countless millions of peoples. Among the more popular pet companions are birds. To keep their cherished family members safe and secure, bird owners use birdcages.

One of the most common problems in bird-keeping today is not providing pet birds with the birdcages and their accessories which are designed to closely imitate the birds' natural environment. A cage is a home and comfort zone, similar to the way people view their own homes. This is where the food is kept and where the familiar waterer hangs. When a bird is under stress, many owners may probably notice that the bird is most relieved when returned to its cage.

The reasons birds need a cage are many. Even if the pet birds are placed in a cage having a proper size, it still may not be entirely comfortable. Where are the birds getting their water? How is a feeder configured? Accordingly, it is impossible to provide pet birds with a proper, safe, and comfortable living environment without paying attention to numerous structural details.

One of the factors that often may be overlooked is that feeders are not configured to provide the pet birds with the necessary habitual attributes found in the birds' natural environment.

A good example is hookbills. These birds may refuse to feed unless they can observe the site in search for a predator. As long as hookbills are sure that there is no imminent danger, they will eat. For these reasons, any feeder, which is made from opaque material, and obscures their vision will not be used by these species. Also, opaque material would prevent owners from learning to observe birds, learning their body language and finding out if the birds eat well. Thus, having a shield preventing the owner from observing the birds, while they are feeding, not only may deprive the owner of a great pleasure, but also may endanger the health of the birds.

Some known feeders comprise a shield configured to prevent the distribution of food wastes from a cage. However, the shield either completely obstructs the owner from viewing the feeding birds or may not be effective for the purposes it is designed.

The vast majority of commercial feeders may be attached only to horizontal bars of a birdcage, but not to vertical bars, and conversely. Also, it is not unusual to see the bird feeder, which may not have a means for its attaching to the birdcage at all. Among those feeders that can be attached to the birdcage, many have a complicated structure.

Still another element of the bird feeder, which may be often not considered during the design stage, is an entrance to the feeder and particularly, the shape of the entrance. The birds may refuse to enter the feeder, if its shape and dimensions are not properly selected.

A need, therefore, exists for bird feeders, which provide the pet birds with a comfortable environment.

Another need exists for bird feeders, which have a structure easily attachable to and detachable from a variety of birdcages.

Still another need exists for bird feeders preventing contamination of an area surrounding birdcages with debris, which may be tossed out from the birdcage.

A further need exists for bird feeders, which can be easily cleaned and refilled.

SUMMARY OF THE INVENTION

The present invention is directed to a feeder assembly that satisfies these needs. The inventive assembly includes a feeder unit and a holder unit, which supports the feeder unit and is removably attached to a birdcage.

The feeder unit includes a cup, which is configured to receive and store food or water, and a shield coupled to the cup. Manufactured either as a one-piece structure or a two-piece structure, in which the cup and shield are detachably coupled to one another, the feeder unit is bird-friendly and designed to resemble a natural environment of a great variety of birds. For example, as mentioned before, numerous species of birds, such as billhooks, must have a clear view of a site, while these birds are feeding. Accordingly, the shield is made from transparent material providing the pet birds with such a possibility. The transparent shield also provides people with a clear view of feeding birds.

The shield has an opening that serves as the entrance to the feeder's interior. Preferably, the opening is configured to have a frustoconical cross-section. The peripheral wall of the shield is configured to surround about 65-75% of the cup's peripheral edge and, thus, effectively prevents the splatter or distribution of food waste from flying outside the birdcage.

If the cup and shield are manufactured as two separate components, the inner wall of the cup is structured to provide a support for the bottom flange of the shield. The support includes a plurality of spaced-apart inner wall segments tapering downwards from the cup's top portion. Each of the tapered wall segments has a broad top region supporting the bottom flange of the shield. To insure that the cup and shield are not movable relative to one another in the assembled state of the feeder, the top region of each tapered wall segment has a respective recess, which is configured to receive a projection or tongue extending from the bottom flange of the shield. Additionally, the top flange of the cup is provided with spaced notches, which are dimensioned to receive lugs extending radially from the bottom rim of the shield. Accordingly, in the assembled state, the tongues and lugs, which are formed on the shield, tightly fit in the recesses and notches, respectively, of the cup.

The holder unit of the inventive assembly includes a post, which extends transversely to and through either horizontal or vertical bars of the peripheral wall of the cage. A further component of the holder is a washer displaceably mounted on the post and operative to be oriented to abut the inner-side segments of either horizontal or vertical bars. Completing the holder unit is a nut couplable to the free outer end of the post and abutting the outer side segments of the bars. Depending on the size of the feeder, the outer side of the washer may be serrated to have a plurality of troughs each dimensioned to reliably receive a respective bar. Tightening the nut on the post leads to a quick and reliable mounting of the holder unit to the cage.

To mount the feeder inside the cage, the user initially attaches the holder unit to the wall of the cage and then, mounts and locks the feeder unit to the holder unit. Conversely, removing the nut from the post allows the user to quickly dismount the feeder assembly from the cage.

Preferably, the holder and feeder units of the inventive assembly are attached to one another by means of a bayonet connection, which includes a pin formed, for example, on the outer side of the cup's peripheral wall, and a recess provided on the holder. The configuration of the pin and recess allows these components to rotate relative to one another between an engaging position in which the holder and feeder units are rotatably fixed to one another and an unlocked position, in which these two components may be separated.

These and other features and aspects of the present invention will be better understood with reference to the following description, figures, and appended claims.

BRIEF DESCIRPTION OF THE FIGURES

FIG. 1 illustrates a side view of a feeder assembly for medium size birds;

FIG. 2 illustrates a front view of the assembly illustrated in FIG. 1;

DETAILED DESCRIPTION

Figure 4:
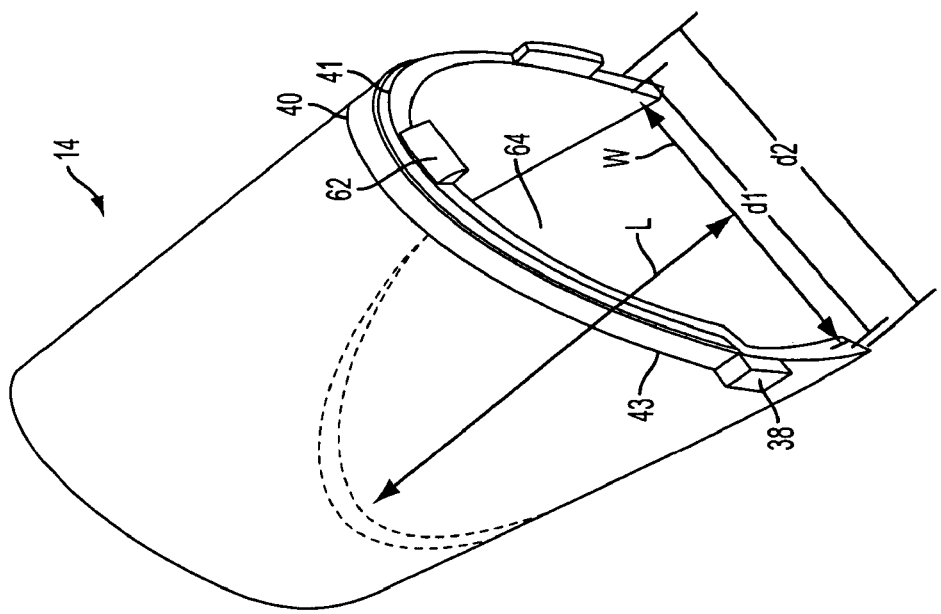
FIG. 4 illustrates the shield of the feeder of the inventive feeder.
Figure 3:
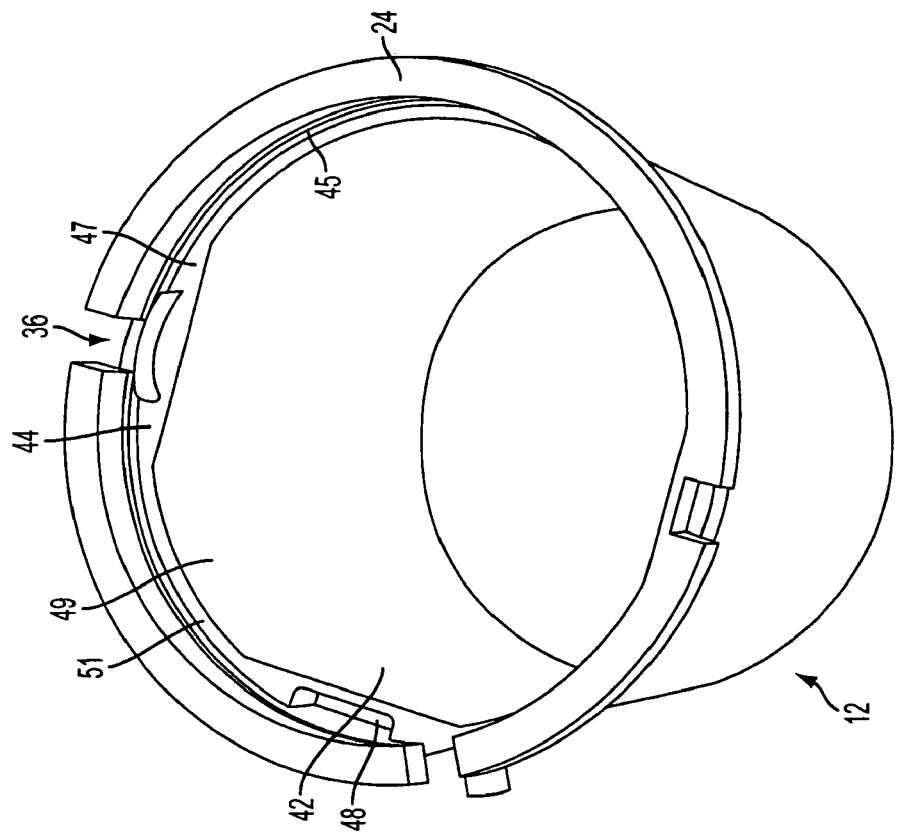
FIG. 3 illustrates a top view of the feeder unit of the inventive assembly.

Reference will now be made in detail to several embodiments of the invention that are illustrated in the accompanying drawings. Wherever possible, same or similar reference numerals are used in the drawings and the description to refer to the same or like parts or steps. The drawings are in simplified form and are not to precise scale. For purposes of convenience and clarity only, directional terms, such as top, bottom, left, right, up, down, over, above, below, beneath, rear, and front may be used with respect to the drawings. These and similar directional terms should not be construed to limit the scope of the invention in any manner. The words "attach," "connect," "couple," and similar terms with their inflectional morphemes do not necessarily denote direct and immediate connections, but also include connections through mediate elements or devices Referring to FIGS. 1-5, 8 and 9, a feeder assembly 10 (FIGS. 1, 2) is configured for medium size birds including, but not limited to, cockatiels, lovebirds and similar size parrots. Assembly 10 includes a feeder unit, which has a cup 12 for storing food or water and a shield or guard 14 for minimizing the splatter, and a holder unit 15 (FIGS. 1, 5 and 8), which is configured to support the feeder unit and couple it to a birdcage.

Figure 8:
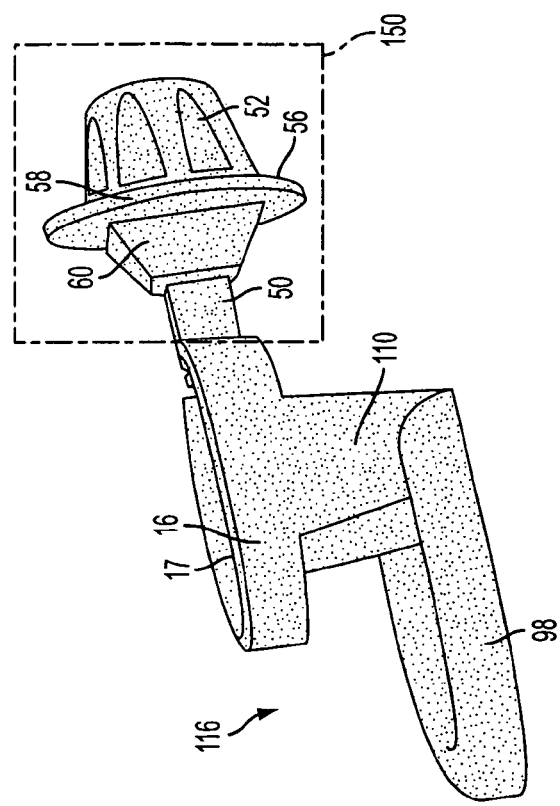
FIG. 8 illustrates an elevation side view of a feeder holder unit configured to support the feeder assembly of FIGS. 6-7.
Figure 9:
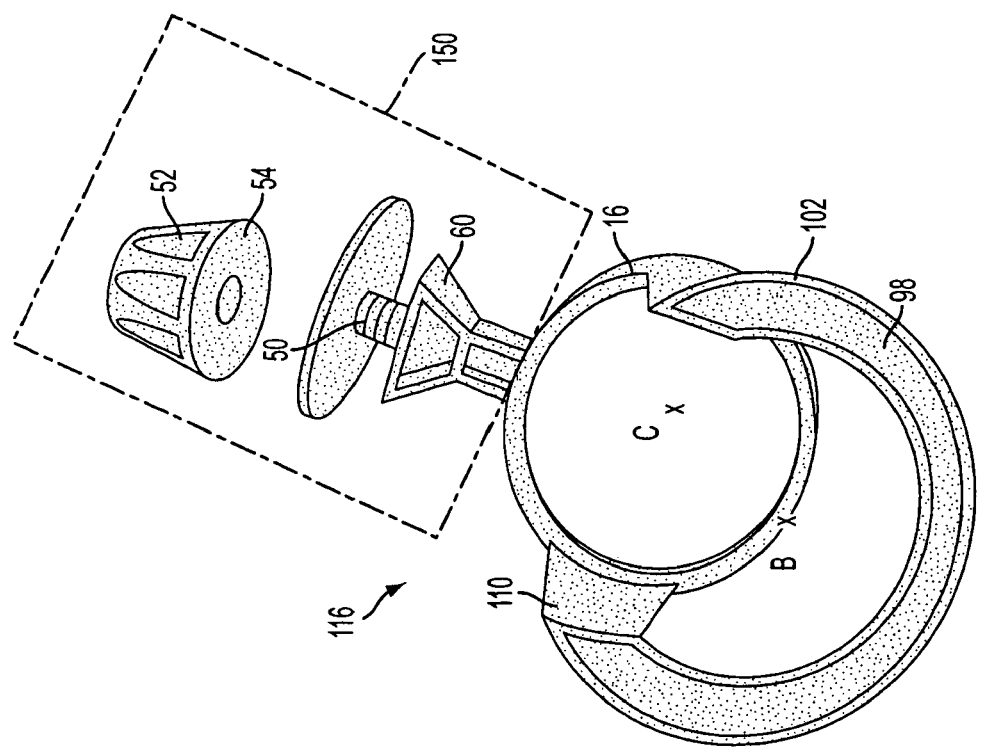
FIG. 9 illustrates an exploded bottom view of the feeder holder unit of FIG. 8.

To mount assembly 10 to the birdcage, the user places a cup holder 16 of holder unit 15 (FIGS. 1, 5, 8 and 9) inside the cage so that a post 50, which is better seen in FIG. 9, has its free end extending outwards between and beyond horizontal or vertical bars of the cage's wall. Then, the user screws a nut 52 on the threaded free end such that the bars of the cage are located between an inner surface 54 of nut 52 (FIG. 9) and an outer side 56 of a washer 58 (FIG. 8), which is mounted slidably and rotatably on rod 50. Bringing washer 58 in close contact with the bars and tightening the nut continue until the inner side of washer 58 urges against a support 60, whereas the bars of the cage are sandwiched between inner surface 54 of nut 52 and outer side 56 of washer 58.

To provide positive engagement between washer 58 and the bars, outer side 56 of washer 58 may be serrated with alternating troughs and ribs. The inner surface of each trough is dimensioned and shaped to receive and extend complementary to the inner segment of a respective bar, when holder unit 15 is fixed to the cage. Whether the bars of the birdcage's walls extend in a horizontal or vertical plane is not important, because washer 58 may be oriented in either one of these planes before holder unit 15 is fixed to the cage.

Birdcages are typically manufactured with vertically or horizontally extending bars, which play an important role in supporting the entire feeder assembly. To provide a reliable contact between the bars and holder unit 15, the outer side of washer 58 is configured with troughs or serrations 57 (FIG. 9D) adapted to abut the bars upon tightening nut 52.

In accordance with one of the inventive aspects, holder unit 15 is configured with a means for selectively adjusting washer 58 so that it can assume a plurality of predetermined positions, in which troughs 57 extend parallel to the bars regardless of the bars' orientation. As a result, when nut 52 is tightened, the contact between the bars and serrations is sufficiently reliable to firmly hold the mounted feeder assembly in place.

Figure 9A:
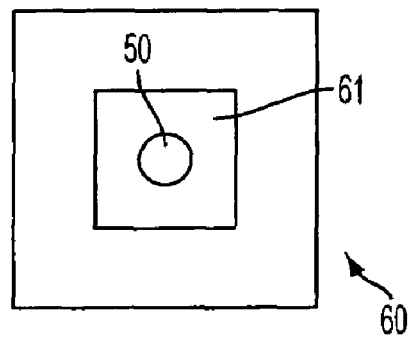
FIG. 9A is a front elevational view an outer face of a support provided on the feeder holder of FIG. 9.
Figure 9B:
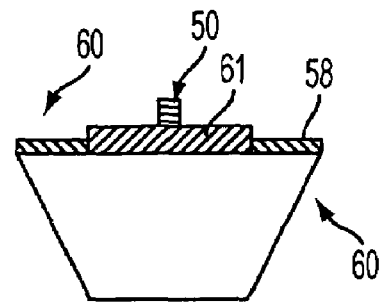
FIG. 9B is a top view of the support illustrated in FIG. 9A.
Figure 9C:
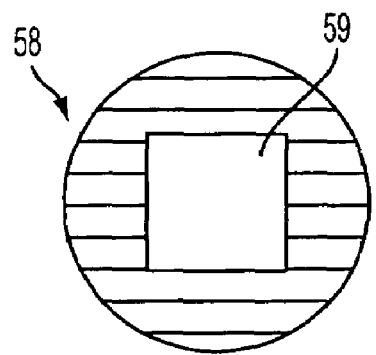
FIG. 9C is a front elevational view of a rear or inner face of a washer provided on the feeder holder of FIG. 9.
Figure 9D:
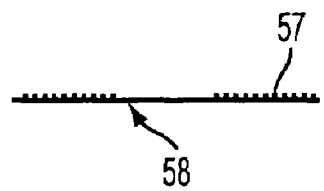
FIG. 9D is a side elevational view of the washer illustrated in FIG. 9C.

In particular, as shown in FIGS. 9A, 9B and 9C, support 60 of holder unit 15 has a protrusion 61 provided on the support's outer face and configured to receive washer 58 in a plurality of predetermined selected positions. The protrusion 61 has a rectangular cross-section and is adapted to engage a rectangularly shaped recess 59, which is formed in washer 58. Accordingly, depending on the plane in which the bars of the cage extend, the pet owner mounts the washer so that the troughs extend parallel to the bars. Dimensions of the protrusion and recess are selected so as to provide reliable engagement between these components preventing rotational displacement of the washer relative to the rest of holder unit 15. Establishing the desire position of washer 58 relative to the bars of the cage facilitates the installation of the feeder assembly since the pet owner does not have to hold the washer while coupling holder unit 15 to the bars.

As mentioned above and illustrated in FIGS. 9A through 9C, the cross-section of recess 59 and protrusion 61 is rectangular, and therein preferably square. However, other polygonal cross-sections can be implemented as well. Furthermore, the cross-section may include all regular or irregular shapes subject only to two requirements: a) opposing surfaces of the recess and protrusion must engage one another in a non-rotational manner, and b) engagement is possible only in preselected positions, in which troughs 57 extend generally parallel to the bars of the cage. Accordingly, the pet owner mounts washer 58 to support 60 so that its troughs 57 extend in a vertical or horizontal plane and, then, displaces the holder unit so that the troughs abut opposing bars of the cage. Finally, the pet owner tightens nut 52 so as to squeeze the bars between the outer side of washer 58 and the inner side of nut 52.

Recess 59 may be formed as a hole opening into the opposite sides of the washer. Alternatively, recess 59 may be formed as a nest or depression in the inner side of the washer. In either case, the depth of the recess is, preferably, substantially identical to the length of the protrusion 61.

In an alternative embodiment, instead of forming protrusion 61 on the outer face of support 60, post 50 may have a polygonal cross-section except for the pole's free end, which is configured to threadedly receive nut 52. Since the washer 58 has to slide along the pole, the pole's proximal area, which is located next to the outer face of support 60, may be slightly enlarged so that when washer 58 is pressed onto this area, the pole and washer are displaceably fixed relative to one another. Obviously, the inner side of washer 58 is abutted by the outer face of support 60 once the washer is fixed to the pole.

In still a further embodiment, the inner side of washer 58 may be provided with a formation extending inwardly towards the outer surface of support 60, which, in turn, may be provided with a nest, depression or seat (not shown). Similarly to the above-discussed embodiments, the peripheral surface of the depression and opposing outer peripheral surface of the protrusion must be shaped and dimensioned so that the washer is non-rotationally engaged in the depression. In this embodiment, like in the previously discussed ones, engagement between the depression and protrusion can be realized only when troughs 57 (FIG. 9D) extend parallel to horizontal or vertical bars of the birdcage.

In any of the above-disclosed modifications, the outer, serrated side of washer 58 is juxtaposed with inner face 54 of nut 52 having the bars of the cage sandwiched between these surfaces upon tightening nut 52. Support 60 is shown to have a frustoconical cross-section having the larger outer face support the inner side of washer 58. However, other cross-sections of support 60 are readily adaptable for the intended purposes.

Figure 10:
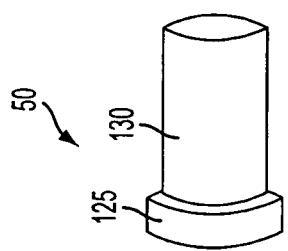
FIG. 10 illustrates a schematic view of the telescopic post of the feeder holder unit.

To provide the user with the possibility of controlling a distance, at which cup holder 16 is spaced from the wall of the cage, post 50 of mounting assembly 150 (FIGS. 5, 8 and 9) can have a telescopic structure, which has multiple components 125 and 130, as shown in FIG. 10.

Figure 6:
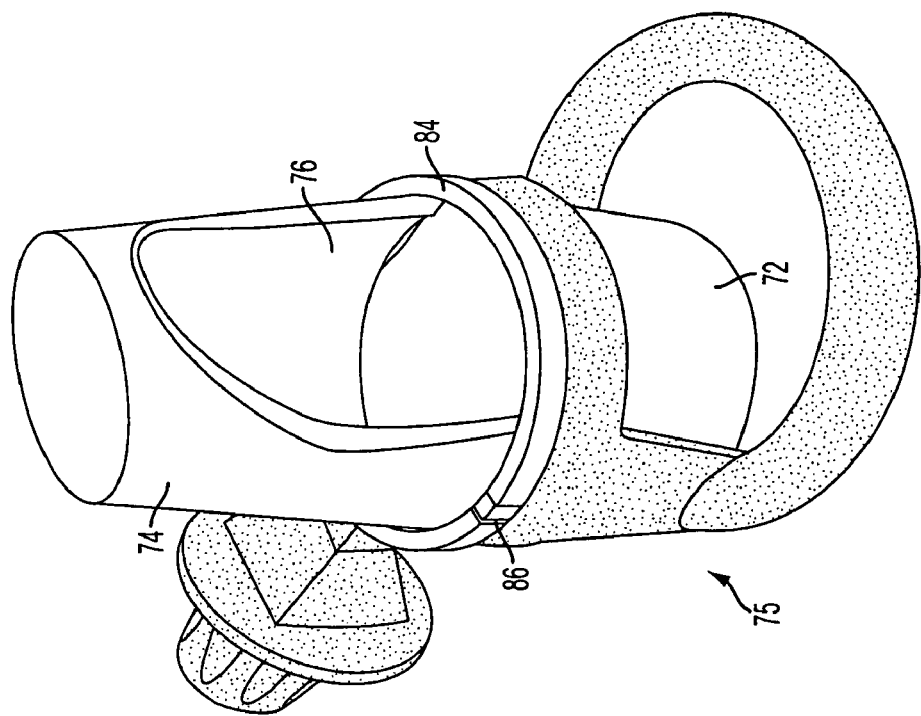
FIG. 6 illustrates a side-front view of another embodiment of the inventive feeder assembly for small size birds.
Figure 7:
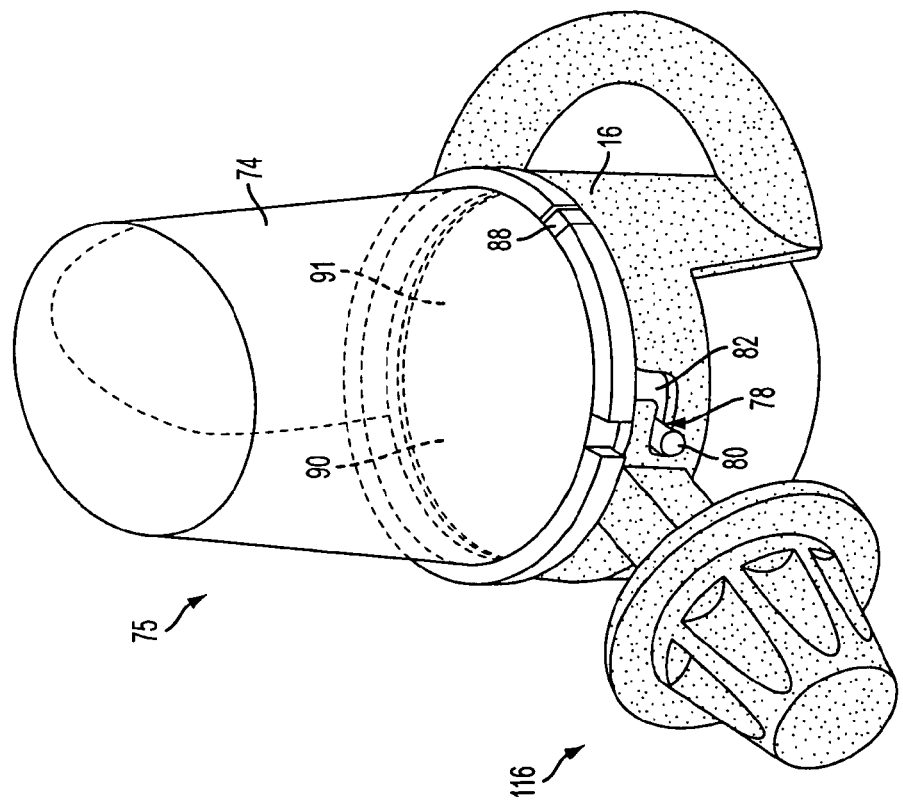
FIG. 7 illustrates a rear-side view of the feeder assembly of FIG. 6.

Note that FIGS. 8 and 9 illustrate the holder unit primarily associated with the feeders for small birds shown in FIGS. 6 and 7. However, the above discussed cup holder 16, support 60, post 50, washer 58 and nut 52, which constitute mounting assembly 150 (FIGS. 5, 8 and 9), remain structurally unchanged for the inventive feeders regardless of their size. Also note that FIG. 13 illustrates the holder unit primarily associated with the feeders for large birds shown in FIGS. 11 and 12 wherein mounting assembly 150 is the same as for feeders of other sizes.

Having attached holder unit 15 to the cage at the desirable location, the user may insert cup 12 into cup holder 16 (FIGS. 1 and 2). The top of cup 12 is provided with a top flange 24 (FIGS. 2 and 3) extending radially outwards from the outer side of the cup's peripheral wall. Accordingly, insertion of the feeder unit into cup holder 16 is stopped, when the bottom surface of flange 24 will land on a top surface 17 (FIG. 8) of cup holder 16. The width of cup holder 16 is selected so that an outer side 26 (FIG. 2) of flange 24 lies substantially flush with the outer side of cup holder 16, thereby minimizing the overall space occupied by assembly 10 in the birdcage. The inner surface of cup holder 16 extends complementary to the outer side of the cup's peripheral wall, which may have a frustoconical, cylindrical or polygonal cross-section. For larger size feeders, cup holder 16 may have an arm 28 (FIG. 2) extending from the bottom of the cup holder and providing an additional element for proper positioning of cup 12 in cup holder 16.

Figure 5:
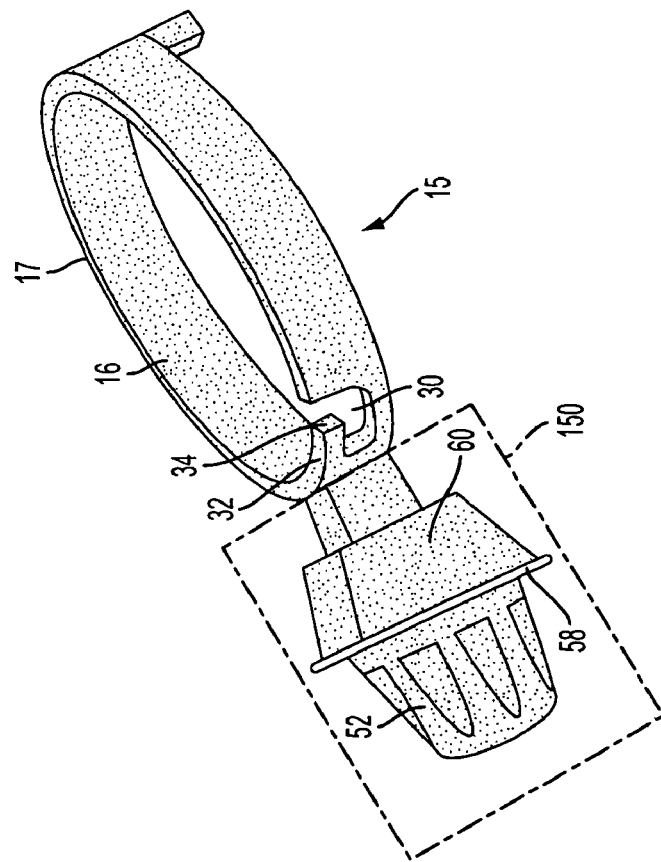
FIG. 5 illustrates a feeder holder unit for mounting the feeder unit of FIG. 3 to a birdcage.

To positively lock cup 12 against voluntary rotation in cup holder 16, assembly 10 is provided with a lock unit. As illustrated in FIGS. 1 and 5, the lock unit is configured as a bayonet connection including a pin 20, which is formed on the outer side of the cup's peripheral wall, and an L-shaped recess 30 (FIG. 5), which is provided on cup holder 16. Initially, the user rotates cup 12 and cup holder 16 relative to one another to align pin 20 with the vertical stretch of recess 30. After pin 20 is received in the vertical stretch, the user further may apply a torque to cup 12 sufficient to force pin 20 to slide along the horizontal stretch of recess 30 between the opposite sides of this stretch. One of the opposite sides, preferably topside 32 (FIG. 5), has an arcuate shape configured so that pin 20, upon reaching the bottom of the horizontal stretch of recess 30, is frictionally engaged between the opposite sides of the horizontal stretch and cannot voluntary move back towards the vertical stretch. Accordingly, positioning pin 20 at the bottom of the horizontal stretch defines a locking position of the feeder and holder unit, as illustrated in FIG. 1.

Even if, during the use of assembly 10, cup 12 accidentally rotates out of the locking position, free end 34 of topside 32 (FIG. 5) of the horizontal stretch will block pin 20 from penetrating into the vertical stretch of recess 30, since this free end extends below the top segment of pin 20, when the latter is received in the horizontal stretch.

To unlock cup holder 16 and cup 12, the user has to apply such a torque that pin 20 will press against and flex free end 34 upwards to allow pin 20 to move to the vertical stretch of recess 30. Finally, upon pulling cup 12 and cup holder 16 from one another, the user will be able to separate these components. Note that the bottom side of the horizontal stretch of recess 30 may be formed with raised opposite ends in the vicinity of the bottom of and mouth, respectively, of the horizontal stretch. The raised portion of the bottom side would lock pin 20 at the bottom of the horizontal stretch and prevent pin 20 from uncontrollable penetration into the vertical stretch, respectively. Such a modification of recess 30 would not require that topside 32 of the horizontal stretch have a curved surface.

As mentioned before, cup 12 and shield 14 of the feeder unit may be manufactured either as a one-piece or two-piece component. In case of the two-piece component structure of the feeder unit, as illustrated in FIGS. 1-4, shield 14 has its bottom portion inserted within and surrounded by the top portion of cup 12 in a manner, in which these components are prevented from accidental decoupling, as disclosed below.

Coupling cup 12 and shield 14 to one another includes a centering stage and a subsequent locking stage. During the centering stage, bottom rim 40 of shield 14 (FIG. 4) is mounted within the top portion of cup 12, as will be explained below. Formed on bottom rim 40 of shield 14 is a bottom flange 41 (FIG. 3), which peripherally coextends with the rim and extends downwards therefrom. Bottom flange 41 is so configured that its outer side is spaced inwards from the outer side of rim 40. In other words, as shown in FIG. 4, an outer diameter $d_1$ of flange 41 is smaller than an outer diameter $d_2$ of bottom rim 40. As a result, flange 41 and rim 40 form therebetween a narrow flat horizontal surface 43, which, upon inserting shield 14 in cup 12, lands on an annular ledge 45 (FIG. 3) provided within the top portion of cup 12 under its top flange 24. Bottom flange 41 of shield 14, in turn, is supported by an annular seat 47 (FIG. 3), which is defined by the top surface of alternating wall segments 49 and segments 42 all formed on the inner side of the cup's peripheral wall. Accordingly, annular seat 47 includes relatively broad or thick top portions 44 (FIG. 3) of segments 42 and relatively narrow top portions 51 (FIG. 3) of segments 49. Placing shield 14 on annular seat 47 centers the shied and cup along a common longitudinal center axis A-A, which is shown in FIG. 1.

To prevent accidental displacement of shield 14 and cup 12 relative to one another, these parts are further engaged the following manner. As surface 43 of shield 12 lands on seat 47 of cup 12, tongues 62 (FIG. 4), which are formed on and extend downwards from flange 41, tightly fit in respective blind holes 48 (FIG. 4) formed in top portions 44 of segments 42. In addition, shield's bottom rim 40 is provided with lugs 38 (FIG. 4) extending laterally outwards from the bottom rim and received in respective notches 36 (FIG. 4), which are formed in top flange 24 of cup 12. Notches 36 and blind holes 48 are shaped complementary to and dimensioned to receive lugs 38 and tongues 62, respectively, in a manner preventing voluntary disengagement between thee formations. As an additional precautionary measure against displacement, tongues 62 may be slightly glued to the bottoms of blind holes 48.

While wall segments 49 of the cup's peripheral wall are formed with a uniform thickness, segments 42 taper towards the bottom of cup 12 and merge with the inner side of the peripheral wall at a distance from the cup's bottom. Thus, although segments 42 has broad top surfaces 44 (FIG. 3), which are necessary for receiving tongues 62 of shield 14, they do not substantially minimize the inner volume of cup 12.

Note that the position of lugs 38 and notches 36 can be reversed by providing the lugs on cup 12 and notches 36 on shield 14. Similarly, tongues 62 (FIG. 4) can be formed on top portions 44 of cup's wall segments 42, whereas blind holes 48 can be provided within shield's bottom flange 14. The above disclosed engagement arrangement between cup 12 and shield 14 is preferable, but not exclusive. For example, the inner side of top flange 24 of cup 12 and the outer side of shield's bottom rim 40 may be screwed to one another, thereby eliminating the need for the projections and indentations, as disclosed above.

As shown in FIGS. 1, 2, 4-6, 7, 11, and 12, shield 14 comprises the surface area of a frustroconical body. The shield includes an opening 64 that has an arcuate upper region 66 and a bottom region 68. The top of the shield comprises an angled surface.

As mentioned before, shield 14 is made from transparent material to help both the pet birds feel as if they were in their natural environment and people observe the birds. To maximize the similarities between the natural and home environment, an opening 64 (FIGS. 2 and 3), which is formed in shield 14, has a specific cross-section and dimensions. Preferably, opening 64 has a substantially frustoconicaly-shaped cross-section defined by an arcuate upper region 66 (FIG. 2) and a bottom region 68. The dimensions of opening 64 are believed to be as important as its shape for providing the birds with a comfortable environment. Preferably, a width W (FIG. 5) of the bottom of opening 64 is about 50-75% of opening's length L. Also, the configuration of opening 64 allows the peripheral wall of shield 14 to surround about 65-75% of the cup's top, thereby effectively minimizing the distribution of food waste from flying outside the birdcage. Finally, the length of the opening's upper region 66 is substantially the same as the length of opening's bottom region 68.

FIGS. 6 and 7 illustrate another embodiment of feeder assembly 75 primarily configured for rather small birds, such as parakeets, canaries, finches and similar size birds. In many aspects, feeder assemblies 10 and 75 shown in FIGS. 1-5 and 7-9, respectively, are structured identically. For example, cups 10 and 72, shields 14 and 74, cup holders 16 and mounting assemblies 150 of assemblies 10 and 75, respectively, differ from one another only in terms of their dimensions.

Like the feeder unit illustrated in FIGS. 1-5, cup 72 and shield 74 of assembly 75 are provided with a combination of engaging formations shaped and sized to match one another for easy and reliable coupling of the shield and cup. In particular, cup 72 has a top flange 84 provided with multiple notches 86 (FIG. 7), each of which receives a respective lug 88 (FIG. 8) formed on the bottom of shield 74. Also, cup 72 has an inner wall provided with downwardly tapering segments 90 and uniformly sized segments 91 (FIG. 7), all of which are configured to support the bottom flange of shield 74, as is explained in reference to the embodiment of FIGS. 1-5. Wall segments 90 each has a respective blind hole, which receives a tongue projecting from the bottom edge of shield 74.

A bayonet connection 78 (FIG. 7), which is provided for mounting the feeder unit to a holder unit 116, includes a pin 80 formed on cup 72 and an L-shaped recess 82 formed on cup holder 16 of holder unit 116. Accordingly, the user initially places cup 72 in cup holder 16 and then rotates the former so that pin 80 engages recess 82 and locks the feeder unit against accidental rotation relative to holder unit 116.

In addition to mounting assembly 150, which includes post 50, support 60, washer 58 and nut 52, all shown in FIGS. 8 and 9, holder unit 116 also has spaced arms 110, which extend downwards from cup holder 16, and a perch 98 coupled to these arms. Peripheral wall 102 of perch 98 is larger than cup holder 16 and centered on an axis B, which extends parallel to, but radially spaced from, an axis C of cup holder 96 (FIG. 9).

Preferably, when cup 72 and shield 74 of the feeder unit are locked in holder unit 116, the cup's bottom terminates in the same plane as the bottom of perch 98. Accordingly, the entire feeder assembly 75 of FIGS. 7-9 may be accessed by bird in flight and landing on perch 98.

Of course, nothing prevents holder unit 15 for larger birds, which is shown in FIG. 5, from being configured identically to holder unit 116 of FIGS. 8-9, and conversely.

Figure 12:
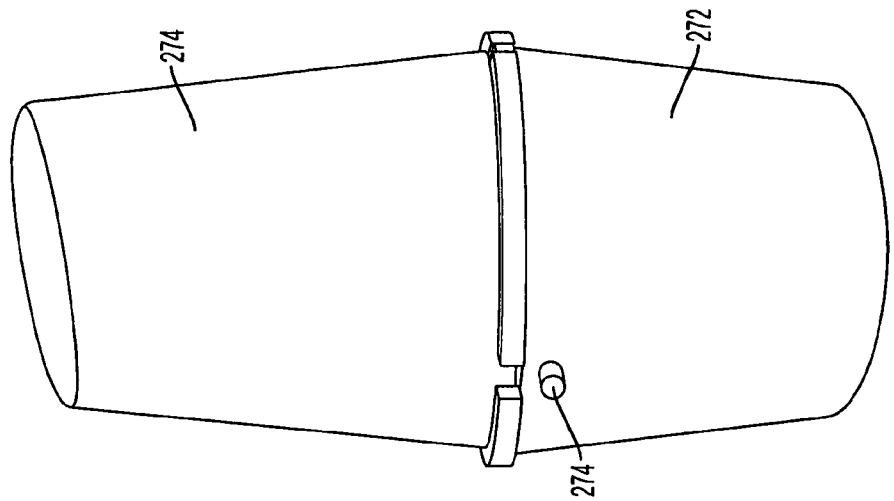
FIG. 12 illustrates a side view of the assembly illustrated in FIG. 11.
Figure 11:
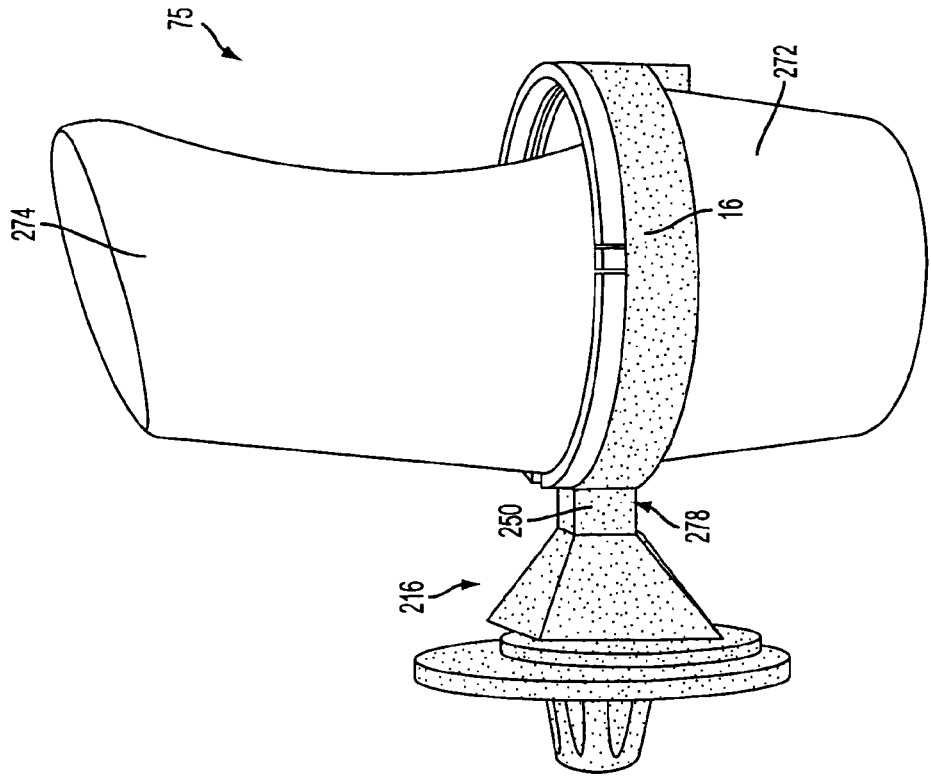
FIG. 11 illustrates a side view of a feeder assembly for large size birds.
Figure 13:
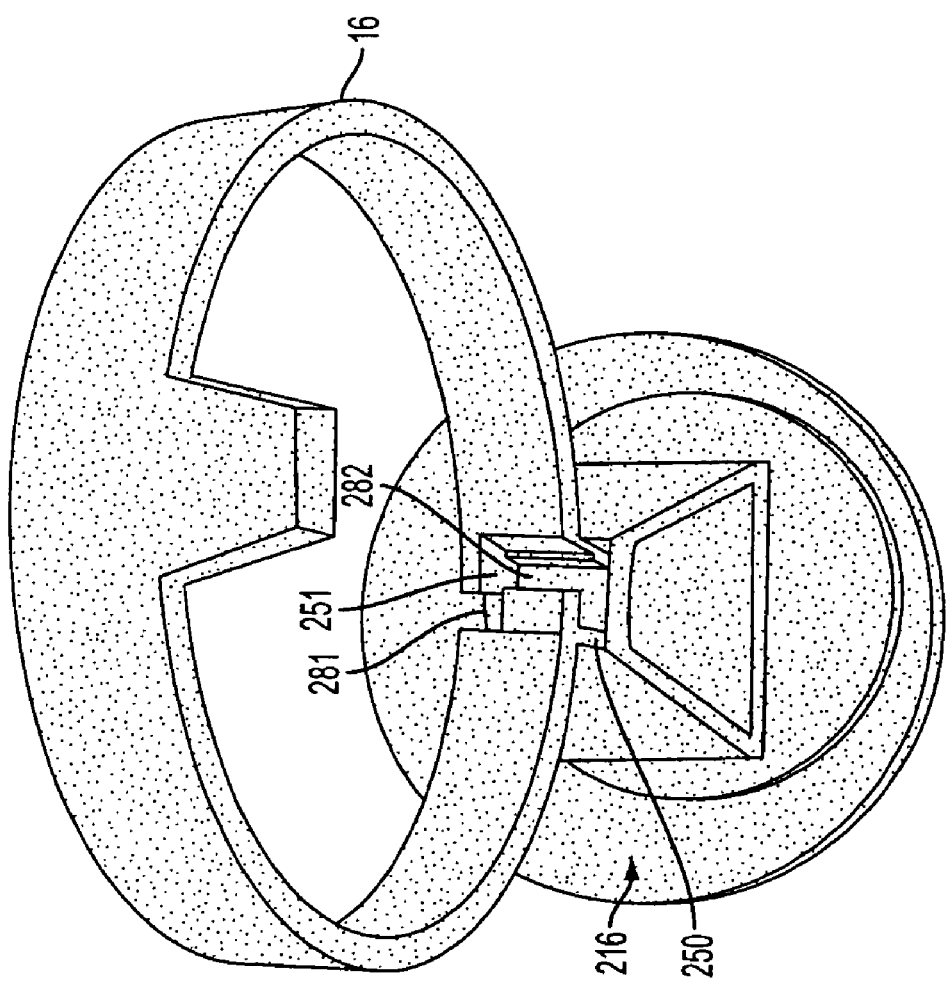
FIG. 13 illustrates a feeder holder unit for mounting the feeder unit of FIG. 11 to a birdcage.

FIGS. 11-13 illustrate another embodiment of a feeder assembly. Therein, feeder assembly 275 is primarily configured for large birds. Like the feeder unit illustrated in FIGS. 1-5, cup 272 and shield 274 of assembly 275 are provided with a combination of engaging formations shaped and sized to match one another for easy and reliable coupling of the shield and cup.

A bayonet connection 278 is provided for mounting the feeder unit to a holder unit 216. A pin 280 is formed slightly off-center on a perpendicular axis on cup 272. A recess 281 and a keyway 282 formed in post 250 of holder unit 216. A protrusion 251 is disposed on the top area of post 250 to aid in retaining pin 280.

Accordingly, the user initially places cup 272 in cup holder 16 and then rotates the former so that pin 280 engages recess 281, travels in keyway 282 and passes protrusion 251 to lock the feeder unit against accidental rotation relative to holder unit 116.

This document describes the inventive birdcage assembly for illustration purposes only. Neither the specific embodiments of the invention as a whole, nor those of its features limit the general principles underlying the invention. The specific features described herein may be used in some embodiments, but not in others, without departure from the spirit and scope of the invention as set forth. The inventive assembly may be enlarged to accommodate large size birds, such African Grays, Amazons and the like. Also, the bayonet connection for locking the feeder unit in the holder unit is formed at the outer side of the assembly, which faces the wall of the cage; however, the number and position of such connections may vary. All of the disclosed components are made from plastic. However, at least some of these components, such as the shield, may be made from glass and other materials. Many additional modifications are intended in the foregoing disclosure, and it will be appreciated by those of ordinary skill in the art that in some instances some features of the invention will be employed in the absence of a corresponding use of other features. The illustrative examples therefore do not define the metes and bounds of the invention and the legal protection afforded the invention, which function is served by the claims and their equivalents.

The invention claimed is:

1. A birdcage feeder assembly, comprising:
   a cup configured to receive and store food or water for birds;
   a shield coupled to the cup and having an opening dimensioned to provide the birds with access to the food and water in the cup, the shield being made from transparent material to allow the birds to observe a site while feeding from the cup; and
   a holder comprising an endless shape so that the cup may be removably held;
   wherein the holder comprises a post and a support for detachably coupling the cup to a birdcage, the endless shape connected to the post so that the cup is spaced from a wall of the birdcage;
   wherein the shield has a peripheral wall provided with the opening, the opening extending from an open bottom of the shield towards a top of the shield and having an upper arcuate portion and a lower portion;
   wherein the peripheral wall of the shield has a bottom rim insertable into a top portion of the cup and surrounded by an inner side of a peripheral wall of the cup, the bottom rim being provided with a bottom flange extending from the bottom rim and having an outer side, the outer side of the bottom flange being spaced inwards from an outer side of the bottom rim so that the outer sides of the bottom rim and flange define a flat bottom surface therebetween;
   wherein the cup has a peripheral wall provided with an inner and outer opposite sides and a top flange atop the inner and outer opposite sides, the inner side of the peripheral wall of the cup being provided with an annular ledge spaced downwards from the top flange and configured to support the flat bottom surface of the shield upon inserting the shield into the top portion of the cup; and
   wherein the bottom rim of the shield has a plurality of spaced lugs extending radially outwards therefrom, the top flange of the cup being provided with a plurality of spaced notches each configured to receive a respective one of the plurality of spaced lugs upon inserting the shield into the cup.

2. The birdcage feeder assembly of claim 1, wherein the shield comprises at least 65% of a peripheral edge of the cup.

3. The birdcage feeder assembly of claim 1, wherein a width of a lower rectilinear portion of the opening is about 50-75% of entire length of the opening, the upper arcuate and lower portions of the opening having a substantially uniform length.

4. A birdcage feeder assembly, comprising:
   a cup configured to receive and store food or water for birds;
   a shield coupled to the cup and having an opening dimensioned to provide the birds with access to the food and water in the cup, the shield being made from transparent material to allow the birds to observe a site while feeding from the cup; and
   a holder comprising an endless shape so that the cup may be removably held;
   wherein the holder comprises a post and a support for detachably coupling the cup to a birdcage, the endless shape connected to the post so that the cup is spaced from a wall of the birdcage;
   wherein the shield has a peripheral wall provided with the opening, the opening extending from an open bottom of the shield towards a top of the shield and having an upper arcuate portion and a lower portion;
   wherein the peripheral wall of the shield has a bottom rim insertable into a top portion of the cup and surrounded by an inner side of a peripheral wall of the cup, the bottom rim being provided with a bottom flange extending from the bottom rim and having an outer side, the outer side of the bottom flange being spaced inwards from an outer side of the bottom rim so that the outer sides of the bottom rim and flange define a flat bottom surface therebetween; and
   wherein the cup has a peripheral wall provided with an inner and outer opposite sides and a top flange atop the inner and outer opposite sides, the inner side of the peripheral wall of the cup being provided with an annular ledge spaced downwards from the top flange and configured to support the flat bottom surface of the shield upon inserting the shield into the top portion of the cup;
   wherein the inner side of the peripheral wall of the cup is provided with a plurality of wall segments each having a respective top surface, the top surfaces of the plurality of wall segments being located below the annular ledge and forming an annular seat, the annular seat being configured to receive and support the bottom flange of the shield.

5. The birdcage feeder assembly of claim 4, wherein the shield comprises at least 65% of a peripheral edge of the cup.

6. The birdcage feeder assembly of claim 4, wherein a width of a lower rectilinear portion of the opening is about 50-75% of entire length of the opening, the upper arcuate and lower portions of the opening having a substantially uniform length.

7. A birdcage feeder assembly, comprising:
   a cup configured to receive and store food or water for birds;
   a shield coupled to the cup and having an opening dimensioned to provide the birds with access to the food and water in the cup, the shield being made from transparent material to allow the birds to observe a site while feeding from the cup; and
   a holder configured to receive and detachably couple the cup to a birdcage;
   wherein the shield has a peripheral wall provided with the opening, the opening extending from an open bottom of the shield towards a top of the shield and having an upper arcuate portion and a lower portion;

wherein the peripheral wall of the shield has a bottom rim insertable into a top portion of the cup and surrounded by an inner side of a peripheral wall of the cup, the bottom rim being provided with a bottom flange extending from the bottom rim and having an outer side, the outer side of the bottom flange being spaced inwards from an outer side of the bottom rim so that the outer sides of the bottom rim and flange define a flat bottom surface therebetween;

wherein the cup has a peripheral wall provided with an inner and outer opposite sides and a top flange atop the inner and outer opposite sides, the inner side of the peripheral wall of the cup being provided with an annular ledge spaced downwards from the top flange and configured to support the flat bottom surface of the shield upon inserting the shield into the top portion of the cup;

wherein the inner side of the peripheral wall of the cup is provided with a plurality of wall segments each having a respective top surface, the top surfaces of the plurality of wall segments being located below the annular ledge and forming an annular seat, the annular seat being configured to receive and support the bottom flange of the shield;

wherein the plurality of wall segments includes downwardly tapering segments and uniformly dimensioned wall segments alternating with one another, the top surface of each downwardly tapering segment being provided with a blind hole configured to receive a respective one of a plurality of spaced tongues formed on and extending from the bottom flange of the shield.

8. The birdcage feeder assembly of claim 7, wherein the shield comprises at least 65% of a peripheral edge of the cup.

9. The birdcage feeder assembly of claim 7, wherein a width of a lower rectilinear portion of the opening is about 50-75% of entire length of the opening, the upper arcuate and lower portions of the opening having a substantially uniform length.

10. The birdcage feeder assembly of claim 7, wherein the downwardly tapering segments merge with the inner side of the peripheral wall of the cup at a distance from a bottom of the cup.

* * * * *